(12) United States Patent
Liu et al.

(10) Patent No.: US 6,580,305 B1
(45) Date of Patent: Jun. 17, 2003

(54) GENERATING A CLOCK SIGNAL (75) Inventors: Jonathan H. Liu, Folsom, CA (US);
John T. Maddux, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,652

(22) Filed: Dec. 29, 1999

(51) Int. Cl.⁷ .............................. G06F 1/04; H03K 3/00
(52) U.S. Cl. .................... 327/298; 327/299; 327/158
(58) Field of Search .............................. 327/291, 298, 327/299, 233, 235, 236, 237, 244, 255, 149, 158

(56) References Cited

U.S. PATENT DOCUMENTS 5,663,767 A * 9/1997 Rumreich et al. .......... 348/537
5,982,212 A * 11/1999 Kobayashi .................. 327/262
5,994,938 A * 11/1999 Lesmeister .................. 327/277
6,100,733 A * 8/2000 Dortu et al. ................ 327/149
6,252,443 B1 * 6/2001 Dortu et al. ................ 327/156

* cited by examiner

Primary Examiner—Terry D. Cunningham
Assistant Examiner—Anh Q Tra
(74) Attorney, Agent, or Firm—Fish & Richardson P.C.

(57) ABSTRACT

An apparatus which generates a clock signal includes a first phase mixer which generates an initial clock signal based on a first set of reference clocks and a buffer which adds a first predetermined delay to the initial clock signal to produce a first clock signal. A phase detection circuit detects a difference in phase between the first clock signal and a master clock signal, and a control circuit selects a second set of reference clocks based on the difference in phase and a second predetermined delay. A second phase mixer generates an output clock signal based on the second set of reference clocks.

45 Claims, 5 Drawing Sheets

GENERATING A CLOCK SIGNAL

BACKGROUND OF THE INVENTION

This invention relates to generating a clock signal.

Clocking circuitry for electronic devices, such as a slave RAC (RAMBUS Application-Specific Integrated Circuit Cell), generates clock signals based on a master clock. Typically, the master clock is a strobe clock, such as a CTM or Clock To Master, for sampling data received from a transmission line. The strobe clock runs about 90 degrees out of phase with the leading edge of the data so that the center of each bit is sampled. By contrast, the data is clocked to/from an electronic device at roughly one "tco" earlier than the leading edge of a bit, where "tco" corresponds to the delay between a data clock and valid output data, which is usually an output buffer delay. The data clock is therefore 90 degrees out of phase with the master clock. Clocking circuitry in the device is used to preserve this phase relationship between the master clock and the data clock.

SUMMARY OF THE INVENTION

In general, in one aspect, the invention relates to generating a clock signal. This aspect of the invention features generating a first clock signal based on a first set of reference clocks, selecting a second set of reference clocks based on the first clock signal and a predetermined delay, and generating a second clock signal, based on the second set of reference clocks, which substantially compensates for the predetermined delay.

Among the advantages of this aspect of the invention may be one or more of the following. Generating the second clock signal based on the first clock signal makes it possible to obtain a proper phase relationship between the second clock signal and a master clock signal. Moreover, taking into account a predetermined delay in the second clock signal reduces phase discrepancies brought about, e.g., by hardware such as input/output (I/O) buffers and package trace delays. A digital control circuit may be used to introduce the predetermined delay. Use of a digital control circuit reduces phase errors that may be introduced from less reliable circuitry.

Other features and advantages of the invention will become apparent from the following description, drawings, and claims.

DESCRIPTION

Figure 1:
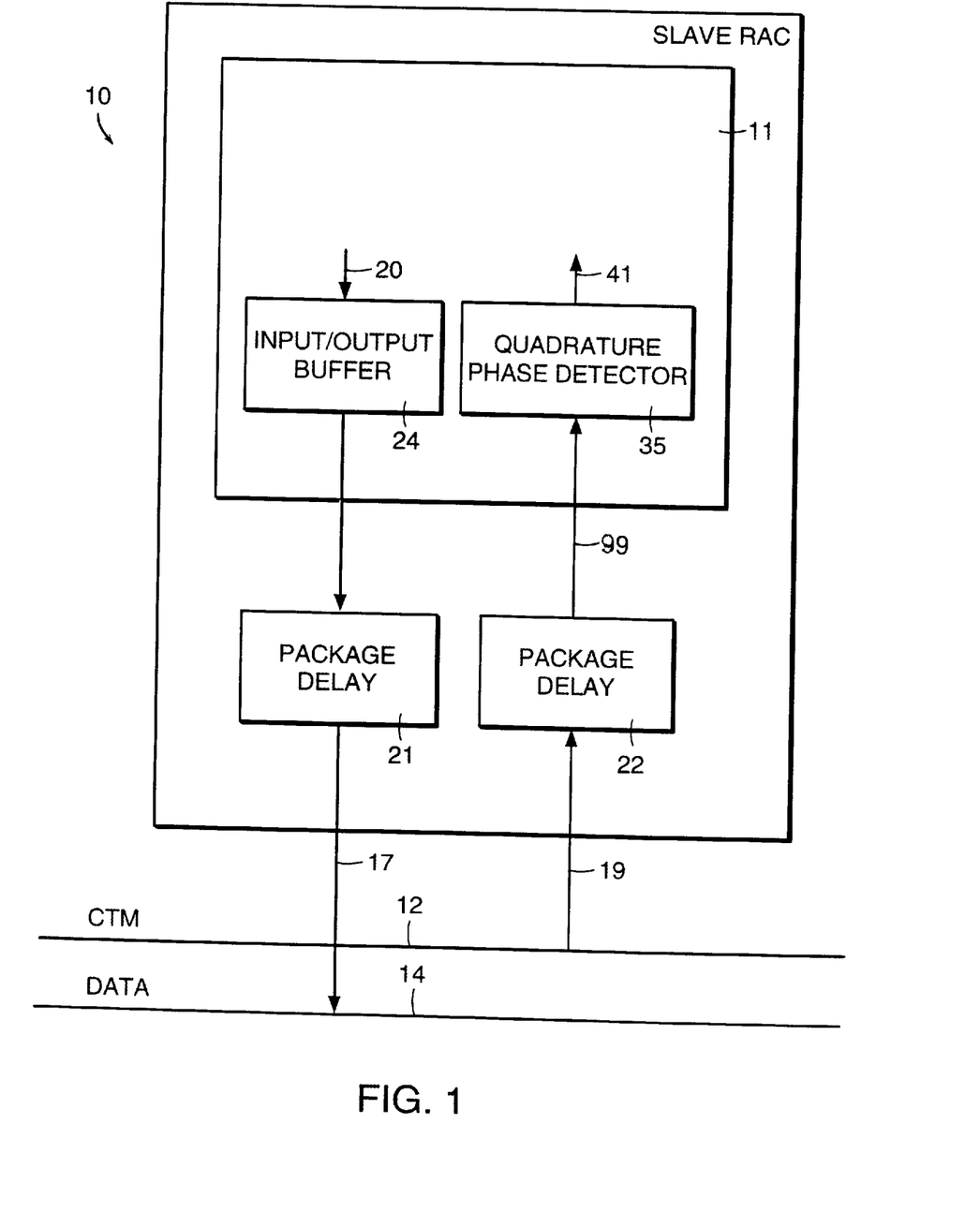
FIG. 1 is a view of clocking circuitry for a slave RAC.

FIG. 1 shows a slave RAC 10 which includes clocking circuitry 11. Clocking circuitry 11 receives a master clock 19 (CTM) from line 12 and outputs data 17 from slave RAC 10 onto data bus 14. A clocking signal for outputting data 17 is determined in accordance with master clock 19.

Figure 2:
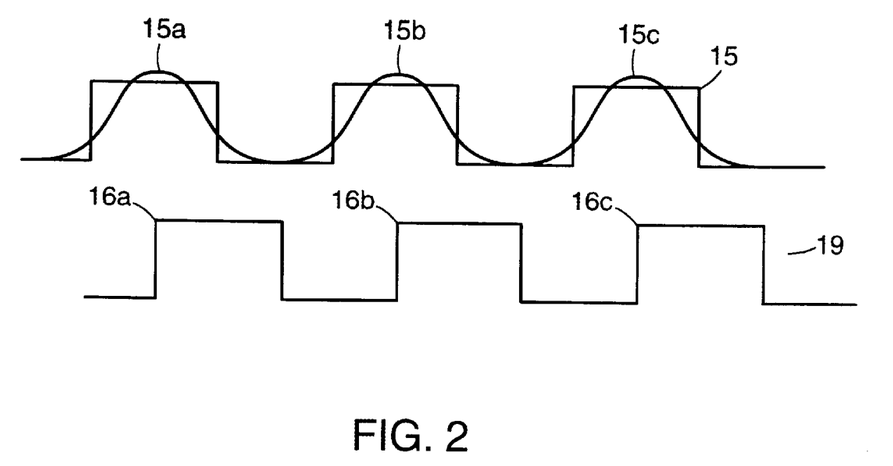
FIG. 2 is a timing diagram which depicts sampling data in accordance with a master clock.

In this embodiment, master clock 19 is a strobe clock that is used to sample data from a transmission line or the like. Data is sampled at the center of each bit, making the master clock roughly 90 degrees out of phase with the leading edge of each bit. For example, as shown in FIG. 2, data 15 is sampled from a transmission line at bits 15a, 15b and 15c. As shown, the rising edges 16a, 16b and 16c of master clock 19 coincide with the centers of bits 15a, 15b and 15c in order to reduce data sampling errors. Alternatively, the bus scheme could be a "double pump" bus scheme, where data is sampled on both the rising and falling edges of master clock 19.

Figure 3:
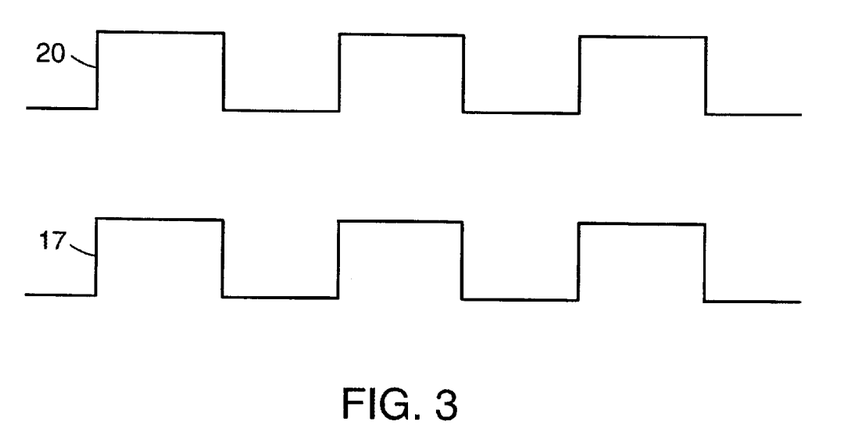
FIG. 3 is a timing diagram which depicts outputting data in accordance with an output clock.

Referring back to FIG. 1, data 17 is transmitted between slave RAC 10 and data bus 14 in accordance with master clock 19. Master clock 19 is provided to clocking circuitry 11 which determines an output clocking signal 20, based on master clock 19, for transmitting data 17 to data bus 14. The phase of clocking signal 20 is shifted relative to master clock 19 such that the triggering edges of clocking signal 20 are ahead of corresponding leading edges of data 17 by the sum of delays of package delays 21 and 22 and I/O buffer 24 (see FIG. 3).

Package delay lines 21 and 22 are interposed between clocking circuitry 11, line 12, and bus 14 to introduce delays in the master clock for accessing data stored in slave RAC 10 and adjusting the phase of the output data. An I/O buffer 24 is also provided for buffering the output data. Clocking circuitry 11 determines the phase of the output clocking signal based, in addition, on the delays associated with I/O buffer 24 and package delay lines 21 and 22.

Figure 4:
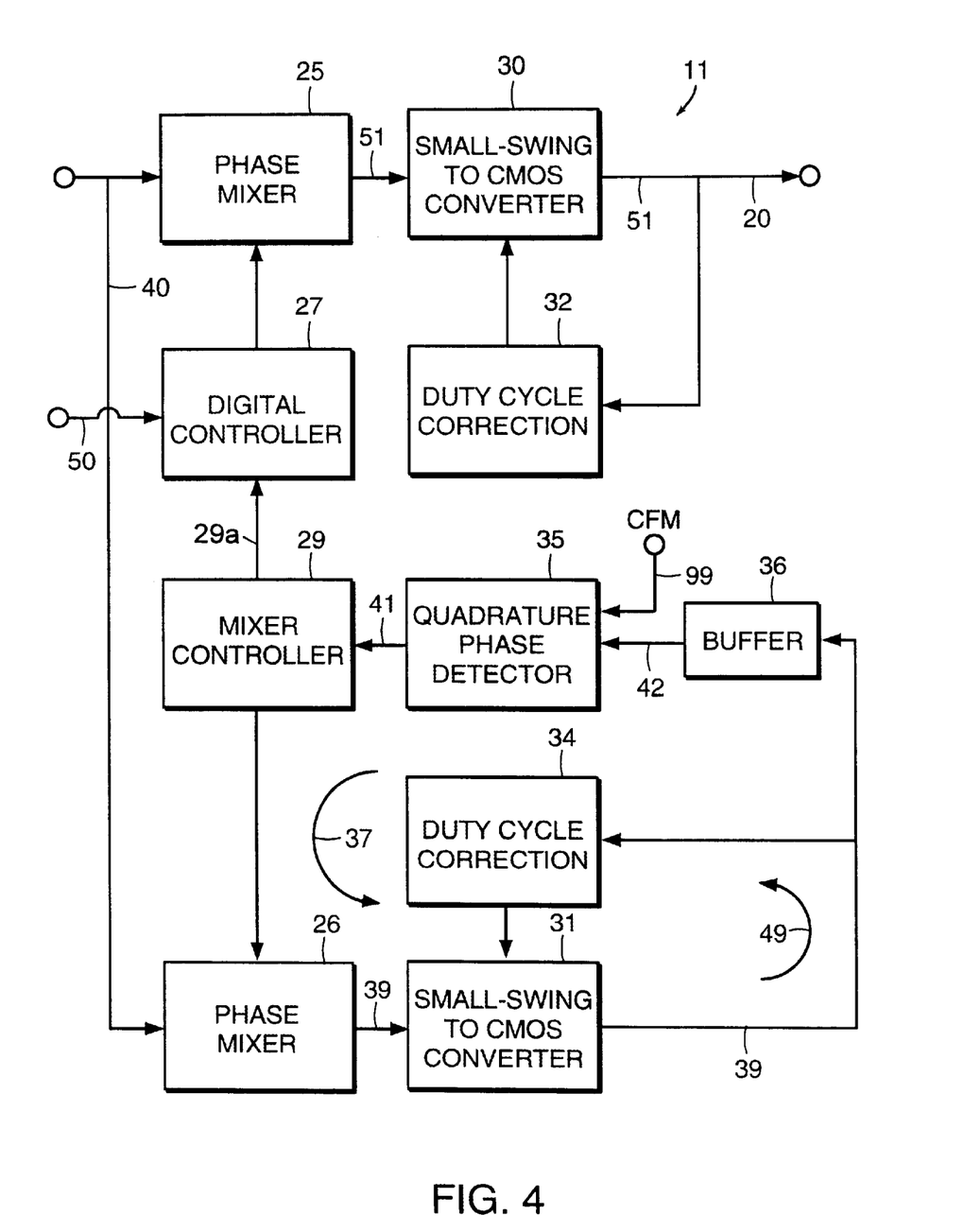
FIG. 4 is a block diagram of the clocking circuitry.

FIG. 4 shows a block diagram of circuitry 11 for determining output clocking signal 20. This circuitry may be implemented using hardware components, such as multipliers, adders, and various logic gates. Circuitry 11 may also be implemented using programmable logic, such as a field programmable gate array (FPGA) or other device.

Circuitry 11 includes phase mixers 25 and 26, digital control circuit 27, mixer controller 29, small-swing CMOS (Complementary Metal Oxide Semiconductor) converters 30 and 31, duty cycle correction circuits 32 and 34, quadrature phase detection (QPD) circuit 35, and feedback buffer 36. Phase mixer 26, small-swing CMOS converter 31, duty cycle correction circuit 34, QPD circuit 35, buffer 36, and mixer controller 29 make up a delay-locked loop (DLL) 37. The operation of circuitry 11 is described in the flowchart of FIG. 5.

Figure 5:
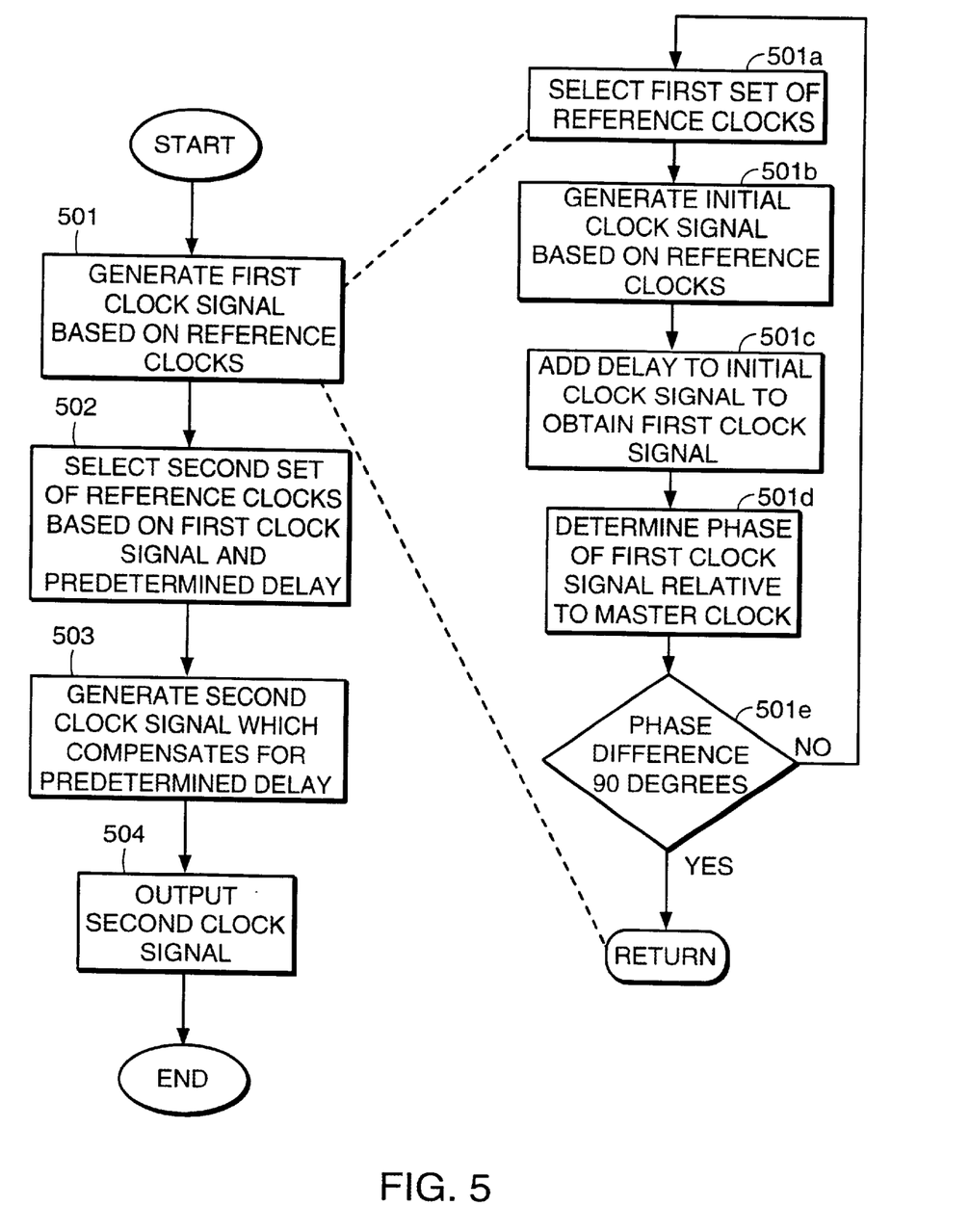
FIG. 5 is a flowchart which shows the operation of the clocking circuitry.

In FIG. 5, a first clock signal 39 is generated (501) based on reference clocks 40. Clock signal 39 passes through buffer 36, where a delay is added to produce clock signal 42. Reference clocks 40 are provided by an electronic device, such as an oscillator (not shown). In this embodiment, eight reference clocks are provided which differ in phase from one another by 45 degrees (or ⅛ of a 360 degree cycle) (see FIG. 6). However, any number of reference clocks may be provided, and the phase angle between those reference clocks may differ by an amount other than 45 degrees.

Delayed master clock 99 (FIG. 1) is input to QPD circuit 35, which outputs a signal 41 indicating the phase relationship of delayed master clock 99 to clock signal 42. Signal 41 indicates whether delayed master clock 99 is leading or lagging clock signal 42. Based on this indication, mixer controller 29 instructs phase mixer 26 to select two reference clocks. Phase mixer 26 then generates a new clock signal 39 based on the selected reference clocks.

Figure 6:
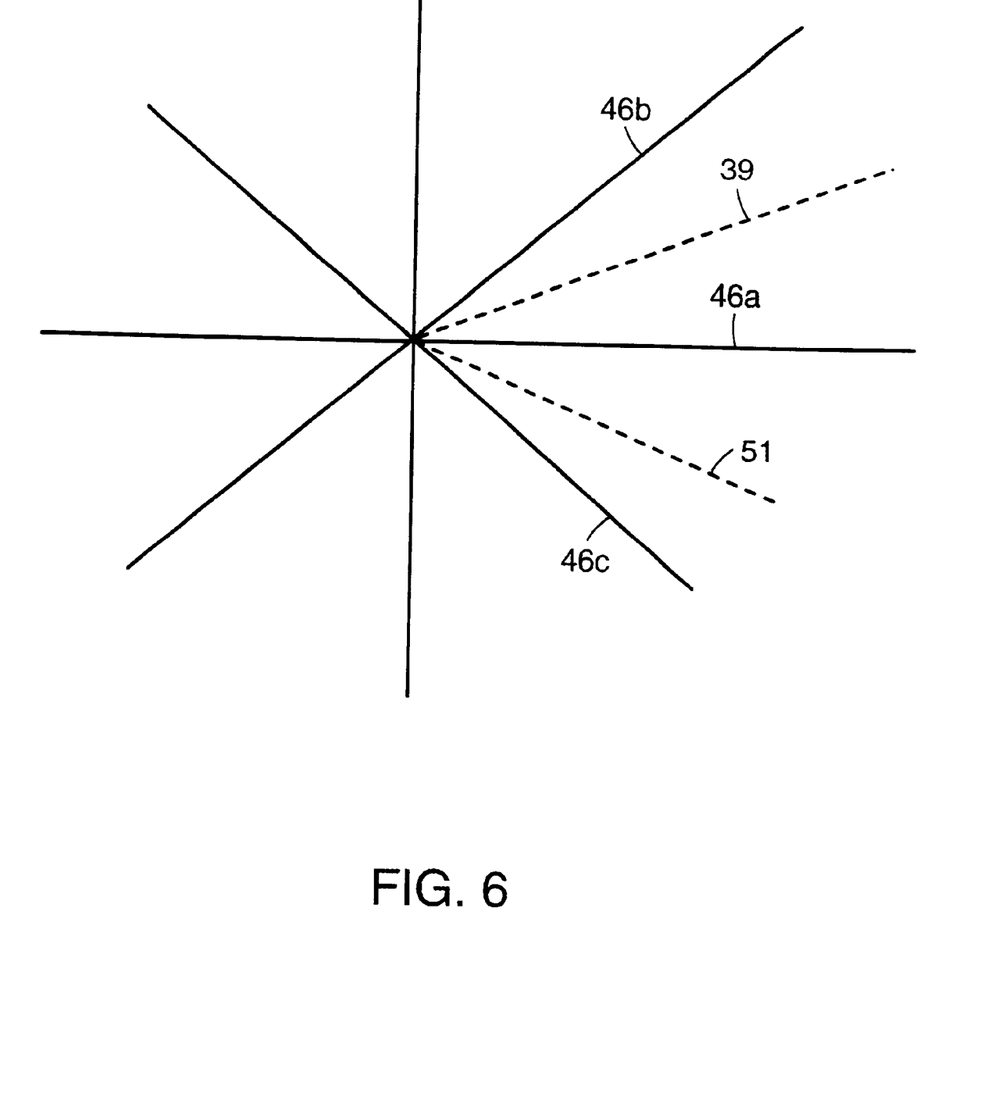
FIG. 6 is a phase diagram showing reference clocks and output data clocks.

More specifically, phase mixer 26 selects (501a) two adjacent reference clock signals that are 45 degrees apart in phase (see FIG. 6). In this embodiment, the 45 degree phase difference corresponds to a 312 picosecond delay. These reference clock signals are selected so that delayed master clock 99 and clocking signal 42 differ in phase by 90 degrees. Phase mixer 26 generates (501*b*) clocking signal 39 by interpolating between clocks 46*a* and 46*b* (FIG. 6) based on information provided from mixer controller 29. Clocking signal 39 could be at any point between clocks 46*a* and 46*b*. This is done by adjusting the phase of one of the selected reference clocks towards the phase of the other selected reference clock. Phase mixer 26 may thus generate a clock signal 39 that is roughly half-way between the two reference clocks 46*a* and 46*b* as shown, for example, in FIG. 6. The resulting clocking signal 39 passes through small-swing CMOS converter 31. Small-swing CMOS converter 31 processes clocking signal 39 so that it ranges between a predetermined voltage value (e.g., 5 volts) and ground. Small-swing CMOS converter 31 is also capable of adjusting the duty cycle of its input signals so that its output signal has a different duty cycle as compared to its inputs.

Clocking signal 39 passes through inner loop 49, which includes duty cycle correction circuit 34. Duty cycle correction circuit 34 detects duty cycle errors in clocking signal 39 and provides an error message to small-swing CMOS converter 31 instructing converter 31 to correct the duty cycle of clocking signal 39. Clocking signal 39 also passes through buffer 36. Buffer 36 adds (501*c*) a delay to clocking signal 39 and provides the resulting clocking signal 42 to QPD circuit 35. The delay added by buffer 36 corresponds to the delay added by I/O buffer 24 (FIG. 1).

QPD circuit 35 then determines (501*d*) the difference (if any) in phase between delayed master clock 19 and clocking signal 42. An indication of the difference is output to mixer controller 29. If the phase difference between delayed master clock 99 and clocking signal 42 is 90 degrees, the process proceeds from 501*e* to 502; otherwise, the process returns to 501*a* where phase mixer 26 selects new reference clocks and 501*a* to 501*e* are repeated. Instead of phase mixer 26 selecting new reference clocks in 501*a*, mixer controller 29 may simply instruct phase mixer 26 to generate a new clocking signal based on the previously-selected reference clocks.

In 502, mixer controller 29 passes its reference clock information to digital controller 27. Digital controller 27 uses this information to select a second set of reference clocks and to interpolate a clock signal 51 such that it is offset by a predetermined amount from clock 39. In this embodiment, digital controller 27 instructs phase mixer 25 to select a second set of reference clocks 46*a* and 46*c* that leads the first set of reference clocks 46*a* and 46*b* by 45 degrees (see FIG. 6). As shown, a single clock 46*a* may be common to both sets of reference clocks. Leading reference clocks are selected to compensate for delays introduced by package delay circuits 21 and 22 (FIG. 1). More specifically, to compensate for the package delay of package delay lines 21 and 22, the second set of reference clocks are used by phase mixer 25 to generate clock 51 which is earlier in phase than clocking signal 39 by the sum of the delays of package delay lines 21 and 22.

Digital controller 27 may be constructed of programmable registers, adders, and other circuitry on die or from discrete hardware components. In either case, control signals 50 are provided to digital controller 27 (from, e.g., an external controller—not shown). These control signals combine with inputs 29*a* (FIG. 4) from mixer controller 29 to implement a predetermined delay through mixer controller 25. Thus, different delays may be added via digital controller 27, depending upon the content of control signals 50.

Phase mixer 25 selects (502) the second set of reference clocks 46*a* and 46*c* based on instructions received from digital controller 27. Phase mixer 25 selects reference clocks that can be used to generate an output clock signal 51 having a phase that leads master clock 19 by a sum corresponding to 90 degrees plus the combined delays of package delay lines 21 and 22 and the delay associated with I/O buffer 24. For example, in FIG. 6, reference clocks 46*a* and 46*c* are selected, which differ in phase by 45 degrees and which also lead reference clocks 46*a* and 46*b* by 45 degrees.

Phase mixer 25 generates (503) the output clock signal (as specified above) based on the selected reference clocks. The output clock signal then passes through small-swing CMOS converter 30 where it is processed so that it ranges between a predetermined voltage (e.g., 5 volts) and ground. Duty cycle correction circuit 32 corrects the duty cycle of output clock signal 51 and passes output clock signal 51 through small-swing CMOS converter 30. Clock signal 51 is then output (504) to clock data from I/O buffer 24 to data bus 14.

The invention is not limited to the specific configuration or environment set forth above. For example, digital controller 27 may not be required if the combined delay of the package delay circuits 20 and 21 is roughly ⅛ (45 degrees lagging) of a period of master clock 12. Circuitry 11 may be used to provide clocking for devices other than a slave RAC, such as an RDRAM (RAMBUS Dynamic Random Access Memory). In fact, the invention can be used on any source bus synchronous channel.

The invention can be used to compensate for delays which do not include the delays of package delays 21 and 22. For example, the invention could be used in connection with a "master" device (vs. a slave RAC), where compensation is not required for package delays. For example, the invention could be used to provide programmable delays between clocks 42 and 51/20 (FIG. 4) and/or to compensate for delay skews between I/O buffer 24 and buffer 36.

Other embodiments not described herein are also within the scope of the following claims.

What is claimed is:

1. A method of generating a clock signal, comprising:

generating a first clock signal based on a first set of reference clocks;

selecting a second set of reference clocks based on the first clock signal, a predetermined delay associated with a delay line, and an external control signal that is independent of the first clock signal, the second set of reference clocks leading the first set of reference clocks by an amount that is based on the predetermined delay;

generating a second clock signal, based on the second set of reference clocks, having a phase which is different from a phase of the first clock signal and which substantially compensates for the predetermined delay; and outputting data from a buffer to a data bus using the second clock signal.

2. A method of generating a clock signal, comprising:

generating a first clock signal based on a first set of reference clocks;

selecting a second set of reference clocks based on the first clock signal, a predetermined delay associated with a delay line, and an external control signal that is independent of the first clock signal, the second set of reference clocks leading the first set of reference clocks by an amount that is based on the predetermined delay; and generating a second clock signal, based on the second set of reference clocks, having a phase which is different from a phase of the first clock signal and which substantially compensates for the predetermined delay, wherein generating the first clock signal comprises:
  selecting the first set of reference clocks;
  generating an initial clock signal based on the first set of reference clocks; and
  adding a second predetermined delay to the initial clock signal to obtain the first clock signal.

3. The method of claim 2, wherein generating the first clock signal further comprises determining a phase of the first clock signal relative to a master clock; and
  wherein, if the phase of the first clock signal differs from a predetermined phase, the method further comprises:
    selecting a different first set of reference clocks; and
    repeating generating the initial clock signal and adding the second predetermined delay using the different first set of reference clocks.

4. The method of claim 1, wherein generating the first clock signal comprises obtaining a clock signal that is within a range of the first set of reference clocks.

5. The method of claim 4, wherein the clock signal is obtained by adjusting a phase of one of the reference clocks in a direction of a phase of another one of the reference clocks.

6. The method of claim 1, wherein the first clock signal is generated so that the first clock signal has a predetermined phase relationship relative to a master clock signal.

7. A method of generating a clock signal, comprising:
  generating a first clock signal based on a first set of reference clocks;
  selecting a second set of reference clocks based on the first clock signal, a predetermined delay associated with a delay line, and an external control signal that is independent of the first clock signal, the second set of reference clocks leading the first set of reference clocks by an amount that is based on the predetermined delay; and
  generating a second clock signal, based on the second set of reference clocks, having a phase which is different from a phase of the first clock signal and which substantially compensates for the predetermined delay,
  wherein generating the second clock signal comprises obtaining a clock signal that is within a range of the second set of reference clocks.

8. The method of claim 7, wherein the clock signal is obtained by adjusting a phase of one of the reference clocks in a direction of a phase of another one of the reference clocks.

9. A method of generating a clock signal, comprising:
  generating a first clock signal based on a first set of reference clocks;
  selecting a second set of reference clocks based on the first clock signal, a predetermined delay associated with a delay line, and an external control signal that is independent of the first clock signal, the second set of reference clocks leading the first set of reference clocks by an amount that is based on the predetermined delay; and
  generating a second clock signal, based on the second set of reference clocks, having a phase which is different from a phase of the first clock signal and which substantially compensates for the predetermined delay,
  wherein selecting the second set of reference clocks comprises:
    combining the first clock signal and the predetermined delay to produce a combined clock signal; and
    selecting a reference clock having a first phase and a reference clock having a second phase such that the combined clock signal has a phase that is within a range of the first phase and the second phase.

10. The method of claim 9, wherein generating the second clock signal comprises adjusting a phase of one of the reference clocks in a direction of a phase of another one of the reference clocks.

11. An apparatus for generating a clock signal, comprising:
  a first circuit which generates a first clock signal based on a first set of reference clocks;
  a control circuit which selects a second set of reference clocks based on the first clock signal, a predetermined delay associated with a delay line, and an external control signal that is independent of the first clock signal, the second set of reference clocks leading the first set of reference clocks by an amount that is based on the predetermined delay;
  a second circuit which generates a second clock signal, based on the second set of reference clocks, having a phase which is different from a phase of the first clock signal and which substantially compensates for the predetermined delay; and
  a buffer which outputs data to a data bus using the second clock signal.

12. An apparatus for generating a clock signal, comprising:
  a first circuit which generates a first clock signal based on a first set of reference clocks;
  a control circuit which selects a second set of reference clocks based on the first clock signal, a predetermined delay associated with a delay line, and an external control signal that is independent of the first clock signal, the second set of reference clocks leading the first set of reference clocks by an amount that is based on the predetermined delay;
  a second circuit which generates a second clock signal, based on the second set of reference clocks, having a phase which is different from a phase of the first clock signal and which substantially compensates for the predetermined delay;
  wherein the control circuit selects the first set of reference clocks and the first circuit generates an initial clock signal based on the first set of reference clocks; and
  a buffer which adds a second predetermined delay to the initial clock signal to obtain the first clock signal.

13. The apparatus of claim 12, further comprising a detection circuit which detects a phase of the first clock signal relative to a master clock;
  wherein, if the phase of the first clock signal differs from a predetermined phase, the control circuit selects a different first set of reference clocks, and the first circuit generates the initial clock signal using the different first set of reference clocks.

14. An apparatus for generating a clock signal, comprising:
  a first circuit which generates a first clock signal based on a first set of reference clocks;
  a control circuit which selects a second set of reference clocks based on the first clock signal, a predetermined delay associated with a delay line, and an external control signal that is independent of the first clock signal, the second set of reference clocks leading the first set of reference clocks by an amount that is based on the predetermined delay; and a second circuit which generates a second clock signal, based on the second set of reference clocks, having a phase which is different from a phase of the first clock signal and which substantially compensates for the predetermined delay, wherein the first circuit comprises a phase mixer circuit which generates the first clock signal by obtaining a clock signal that is within a range of the first set of reference clocks.

15. The apparatus of claim 14, wherein the first circuit obtains the clock signal by adjusting a phase of one of the reference clocks in a direction of a phase of another one of the reference clocks.

16. The apparatus of claim 11, wherein the first circuit generates the first clock signal so that the first clock signal has a predetermined phase relationship relative to a master clock signal.

17. An apparatus for generating a clock signal, comprising:

a first circuit which generates a first clock signal based on a first set of reference clocks;

a control circuit which selects a second set of reference clocks based on the first clock signal, a predetermined delay associated with a delay line, and an external control signal that is independent of the first clock signal, the second set of reference clocks leading the first set of reference clocks by an amount that is based on the predetermined delay; and a second circuit which generates a second clock signal, based on the second set of reference clocks, having a phase which is different from a phase of the first clock signal and which substantially compensates for the predetermined delay, wherein the second circuit comprises a phase mixer circuit which generates the second clock signal by obtaining a clock signal that is within a range of the second set of reference clocks.

18. The apparatus of claim 17, wherein the second circuit obtains the clock signal by adjusting a phase of one of the reference clocks in a direction of a phase of another one of the reference clocks.

19. The apparatus of claim 11, wherein the control circuit comprises a digital controller.

20. An apparatus for generating a clock signal, comprising:

a first phase mixer which generates an initial clock signal based on a first set of reference clocks;

a buffer which adds a first predetermined delay to the initial clock signal to produce a first clock signal;

a phase detection circuit which detects a difference in phase between the first clock signal and a master clock signal;

a control circuit which selects a second set of reference clocks based on the difference in phase, a second predetermined delay associated with a delay line, and an external control signal that is independent of the first clock signal, the second set of reference clocks leading the first set of reference clocks by an amount that is based on the predetermined delay; and a second phase mixer which generates an output clock signal based on the second set of reference clocks, the output clock signal having a phase which is different from a phase of the first clock signal.

21. The apparatus of claim 20, wherein the master clock signal comprises a strobe clock for sampling data.

22. The apparatus of claim 20, wherein the output clock is a predetermined amount out of phase with the master clock.

23. The apparatus of claim 22, wherein the predetermined amount comprises a sum of 90 degrees, the first predetermined delay, and the second predetermined delay.

24. The apparatus of claim 20, wherein the control circuit comprises a digital controller.

25. An apparatus for generating a clock signal, comprising:

means for generating a first clock signal based on a first set of reference clocks;

means for selecting a second set of reference clocks based on the first clock signal and a predetermined delay associated with a delay line, the second set of reference clocks leading the first set of reference clocks by an amount that is based on the predetermined delay;

means for generating a second clock signal, based on the second set of reference clocks, having a phase which is different from a phase of the first clock signal and which substantially compensates for the predetermined delay; and means for outputting data from a buffer to a data bus using the second clock signal.

26. The method of claim 1, wherein generating the first clock signal comprises interpolating between two reference clocks in the first set of reference clocks.

27. The method of claim 1, wherein generating the second clock signal comprises interpolating between two reference clocks in the second set of reference clocks.

28. The method of claim 2, wherein generating the first clock signal comprises interpolating between two reference clocks in the first set of reference clocks.

29. The method of claim 2, wherein generating the second clock signal comprises interpolating between two reference clocks in the second set of reference clocks.

30. The method of claim 7, wherein generating the first clock signal comprises interpolating between two reference clocks in the first set of reference clocks.

31. The method of claim 7, wherein generating the second clock signal comprises interpolating between two reference clocks in the second set of reference clocks.

32. The method of claim 9, wherein generating the first clock signal comprises interpolating between two reference clocks in the first set of reference clocks.

33. The method of claim 9, wherein generating the second clock signal comprises interpolating between two reference clocks in the second set of reference clocks.

34. The apparatus of claim 11, wherein generating the first clock signal comprises interpolating between two reference clocks in the first set of reference clocks.

35. The apparatus of claim 11, wherein generating the second clock signal comprises interpolating between two reference clocks in the second set of reference clocks.

36. The apparatus of claim 12, wherein generating the first clock signal comprises interpolating between two reference clocks in the first set of reference clocks.

37. The apparatus of claim 12, wherein generating the second clock signal comprises interpolating between two reference clocks in the second set of reference clocks.

38. The apparatus of claim 14, wherein generating the first clock signal comprises interpolating between two reference clocks in the first set of reference clocks.

39. The apparatus of claim 14, wherein generating the second clock signal comprises interpolating between two reference clocks in the second set of reference clocks.

40. The apparatus of claim 20, wherein the first phase mixer generates the initial clock signal by interpolating between two reference clocks in the first set of reference clocks.

41. The apparatus of claim 20, wherein the second phase mixer generates the second clock signal by interpolating between two reference clocks in the second set of reference clocks.

42. The apparatus of claim 25, wherein generating the first clock signal comprises interpolating between two reference clocks in the first set of reference clocks.

43. The apparatus of claim 25, wherein generating the second clock signal comprises interpolating between two reference clocks in the second set of reference clocks.

44. The apparatus of claim 17, wherein generating the first clock signal comprises interpolating between two reference clocks in the first set of reference clocks.

45. The apparatus of claim 17, wherein generating the second clock signal comprises interpolating between two reference clocks in the second set of reference clocks.

* * * * *